(12) United States Patent
Vermeulen et al.

(10) Patent No.: US 10,108,624 B1
(45) Date of Patent: Oct. 23, 2018

(54) CONCURRENT DIRECTORY MOVE OPERATIONS USING RANKING RULES

(71) Applicant: Amazon Technologies, Inc., Seattle, WA (US)

(72) Inventors: Allan Henry Vermeulen, Corvallis, OR (US); Matteo Frigo, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 479 days.

(21) Appl. No.: 14/614,075

(22) Filed: Feb. 4, 2015

(51) Int. Cl.
  *G06F 17/30* (2006.01)
  *G06Q 30/02* (2012.01)

(52) U.S. Cl.
  CPC .. *G06F 17/30082* (2013.01); *G06F 17/30348* (2013.01); *G06F 17/30675* (2013.01); *G06F 17/30864* (2013.01); *G06Q 30/02* (2013.01)

(58) Field of Classification Search
  CPC ......... G06F 17/30864; G06F 17/30867; G06F 17/30675; G06F 17/30882; G06Q 30/02
  USPC ....................................................... 707/748
  See application file for complete search history.

(56) References Cited

U.S. PATENT DOCUMENTS

| | | |
|---|---|---|
| 6,654,772 B1 | 11/2003 | Crow et al. |
| 6,842,754 B2 | 1/2005 | Muntz |
| 7,043,637 B2 | 5/2006 | Bolosky et al. |
| 7,240,114 B2 | 7/2007 | Karamanolis et al. |
| 8,112,395 B2 | 2/2012 | Patel et al. |
| 8,112,452 B2 * | 2/2012 | Adya ................ G06F 17/30094 707/802 |
| 8,205,090 B2 | 6/2012 | Oom Temudo de Castro et al. |
| 8,229,985 B2 | 7/2012 | Turner et al. |
| 8,285,689 B2 | 10/2012 | Du et al. |
| 8,356,162 B2 | 1/2013 | Muff et al. |
| 8,429,248 B1 | 4/2013 | Ketrenos et al. |
| 8,489,658 B2 | 7/2013 | Turner et al. |
| 8,539,008 B2 | 9/2013 | Faith et al. |

(Continued)

FOREIGN PATENT DOCUMENTS

| | | |
|---|---|---|
| WO | 19999038095 | 7/1999 |

OTHER PUBLICATIONS

Daniel Phillips, "A Directory Index for Ext2", USENIX, Sep. 19, 2001, pp. 1-13.

(Continued)

*Primary Examiner* — Pierre M Vital
*Assistant Examiner* — Andrew N Ho
(74) *Attorney, Agent, or Firm* — Robert C. Kowert; Meyertons, Hood, Kivlin, Kowert & Goetzel, P.C.

(57) ABSTRACT

A metadata manager of a file system receives a directory move request, indicating a source directory (SD) and a proposed parent directory (PPD). Each directory in the directory tree is assigned a respective move rank (MR) in accordance with a rank-order preserving rule. The metadata manager checks whether the MR of the SD or the PPD is to be changed to avoid violating the rule. If an MR change is required, one or more directory-pair operations are implemented to determine whether the move can be successfully completed. In each directory-pair operation, the MRs of a pair of directories is examined and an attempt is made to modify one of the MRs of the pair in accordance with the rule. If enough MRs can be changed, the move is completed by adding the SD as a child of the PPD.

21 Claims, 9 Drawing Sheets

(56) References Cited

U.S. PATENT DOCUMENTS

| | | | | |
|---|---|---|---|---|
| 2002/0138559 | A1* | 9/2002 | Ulrich | G06F 17/30067 709/203 |
| 2003/0009484 | A1* | 1/2003 | Hamanaka | G06F 17/30067 707/999.2 |
| 2004/0024786 | A1* | 2/2004 | Anderson | G06F 17/30067 707/200 |
| 2004/0181605 | A1 | 9/2004 | Nakatani et al. | |
| 2005/0192985 | A1* | 9/2005 | Tsuchiya | G06F 17/30091 707/100 |
| 2005/0246393 | A1* | 11/2005 | Coates | G06F 3/0607 707/200 |
| 2006/0179037 | A1* | 8/2006 | Turner | G06F 17/30067 707/3 |
| 2009/0132552 | A1* | 5/2009 | Adya | G06F 17/30094 707/999.01 |
| 2010/0106696 | A1* | 4/2010 | Tamas | G06F 17/30171 707/704 |
| 2010/0235413 | A1* | 9/2010 | Patel | G06F 11/1076 707/825 |
| 2011/0307534 | A1 | 12/2011 | Peng et al. | |
| 2012/0036161 | A1* | 2/2012 | Lacapra | G06F 17/30194 707/781 |
| 2012/0265782 | A1* | 10/2012 | Turner | G06F 17/30067 707/769 |
| 2015/0356110 | A1* | 12/2015 | Lin | G06F 17/30171 707/704 |
| 2016/0117336 | A1* | 4/2016 | Aron | G06F 17/30194 707/688 |

OTHER PUBLICATIONS

Robert Escriva et al., "HyperDex: A Distributed, Searchable Key-Value Store", Aug. 13-17, 2012, pp. 1-12.
Leslie Lamport, "Paxos Made Simple", Nov. 1, 2001, pp. 1-14.
2012 Storage Networking Industry Association, "An Overview of NFSv4: NFSv4.0, NFSv4/1, pNFS, and proposed NFSv4.2 features" Jun. 2012, pp. 1-14.
Amazon Web Services "Amazon Virtual Private Cloud, User Guide, API Version" Feb. 1, 2014, pp. 1-155.
U.S. Appl. No. 14/231,088, filed Mar. 31, 2014, Pradeep Vincent et al.
U.S. Appl. No. 14/231,070, filed Mar. 31, 2014, Matti Juhani Oikarinen et al.
U.S. Appl. No. 14/231,077, filed Mar. 31, 2014, Jacob A. Strauss et al.

* cited by examiner

CONCURRENT DIRECTORY MOVE OPERATIONS USING RANKING RULES

BACKGROUND

File systems of various types, commonly organized as trees of directories or folders, are used by millions of users every day to store and access data in various types of computing environments. Some file systems may be implemented using local storage devices and computational resources of a single computer server, while other file systems may be distributed among numerous servers and storage devices, with user read and write requests being handled via network messages. In some provider network environments, for example, tens of thousands of clients of a distributed file storage service may potentially be granted access to one or more file systems, with the data and metadata of the file systems being spread among numerous devices at one or more data centers to support desired levels of performance, availability and data durability.

Many traditional file systems were designed for relatively low levels of concurrency compared to the concurrency that may have to be supported in today's cloud-based computing infrastructures. As the expected number of concurrent file system users has increased, various optimizations (such as partitioning file data across numerous storage devices, caching file data, and so on) have been implemented to improve the file I/O (input/output) responsiveness and file I/O bandwidths. However, at least in some file system implementations, operations such as directory moves may still involve the acquisition of file-system-wide locks. The use of a file-system-wide lock guarantees that no more than one such operation can proceed at a time within a given file system, independently of the depth and width of the directory tree of the file system, and independently of the number of users of the file system. While the lock is held on behalf of one user's directory move request, changes to the file system's directory tree by any other user are prevented, and it therefore becomes easier to detect and prevent illegal directory moves such as the equivalent of "mv /a /a/b/c/d" which might lead to loops within the tree. While such restrictions on concurrent directory moves may be reasonable for small-scale or single-server file systems, they may not be quite as acceptable in environments in which thousands of users distributed around the world share access to a large distributed file system. Different users may store their files in completely disjoint sub-trees of the file system's directory tree, for example, and may wish to be permitted to reorganize their sub-tree structure without the kinds of delays that may result from the use of a single file-system-wide lock.

Figure 1:
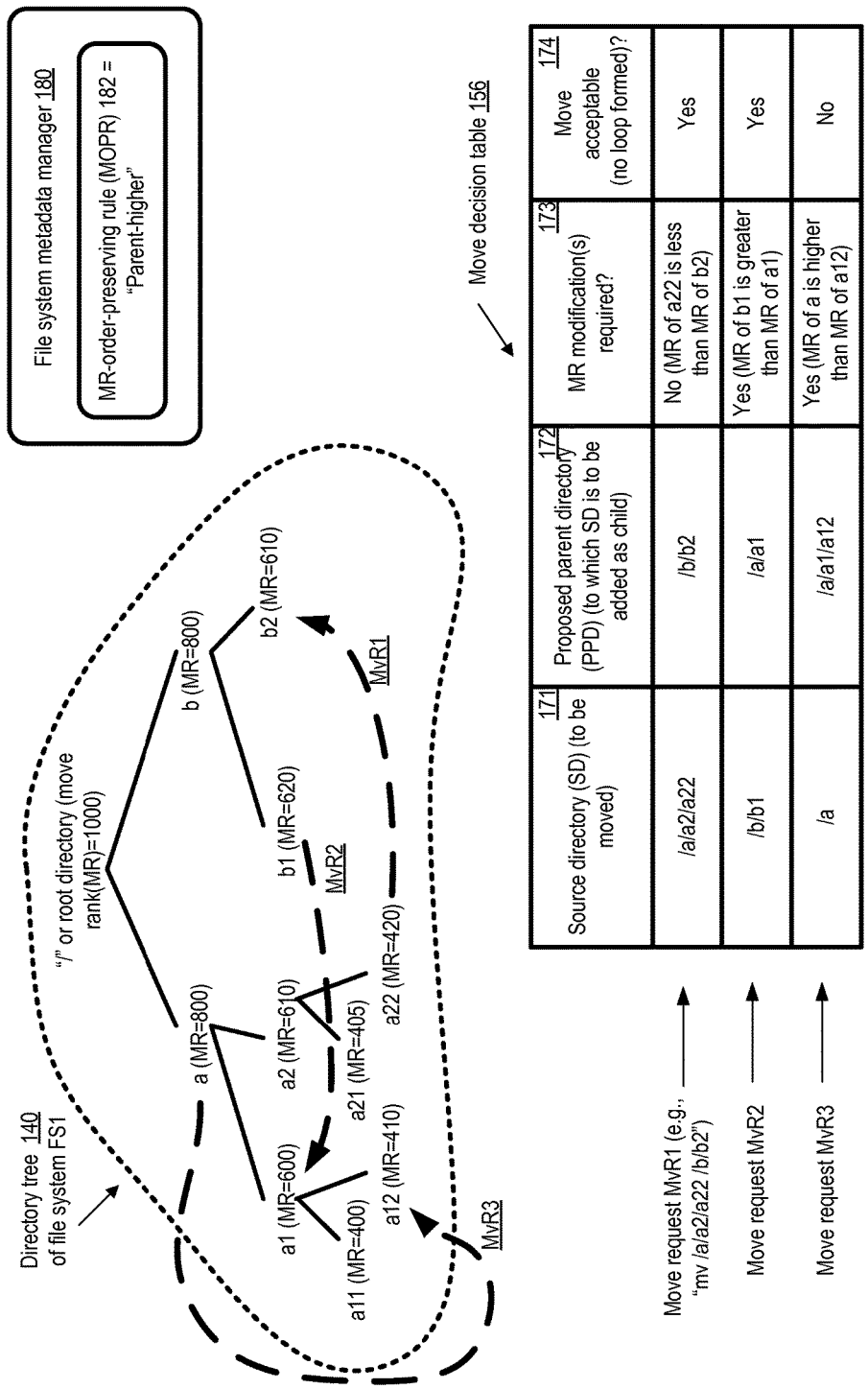
FIG. 1 illustrates an example file system metadata manager configured to support directory move operations using respective move ranks assigned to the directories of the file system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for supporting concurrent directory move operations within a single file system and for efficiently detecting illegal directory move attempts are described. To simplify the presentation, in much of the following description the directories of a file system are assumed to be arranged in a tree with a single root directory, with each directory (except the root directory) configured as a child of a single parent directory, and with each directory (including the root directory) configured as a parent of zero or more child directories. Loops may not be permitted in the tree—that is, a given directory may not appear twice in the same path from a leaf directory to the root directory. A successful directory move operation in such a tree results in a change to the parent of one directory (the directory being moved, also referred to as the "source" directory with respect to the move), and the addition of a child directory to a different directory (the "proposed parent" directory). Some attempted directory move operations (e.g., moves that would lead to loops in the tree) may be illegal, and may be detected and rejected as illegal using the techniques described herein. It is noted that directory move techniques similar to those described herein may also be used for file systems with multiple root directories in some embodiments, or for file systems in which a given directory may have multiple parent directories. In various embodiments, the techniques may be used for single-host or single-server file systems (e.g., in which all the data and metadata of a given file system is maintained within a single hardware server and its locally-attached storage), and/or for distributed file stores in which the contents of a given file system may be spread across numerous storage devices of one or more data centers. It is noted that the term "folder" may be used to refer to a directory in some types of computing environments, and that the techniques for supporting concurrent moves of directories may be employed in various embodiments regardless of the specific nomenclature being used for file systems and their subcomponents.

Directory move operations may be triggered by various types of client requests or commands in different embodiments, such as client-issued "mv" commands in Linux-based or Unix™-based environments and "move" commands in Windows-based environments. Directory move operations may also be sometimes referred to as directory "rename" operations, since the transition of a directory from one location in the directory hierarchy to another also results in the change to the name or path typically used to refer to the directory. In some cases different management policies (including different directory move-related rules of the kinds described below) may be designated for the different file systems instantiated. In at least one embodiment, not all the file systems created at a given host or at a distributed file store may support concurrent directory moves.

According to some embodiments, various directories of a given file system may each be assigned a respective move rank (MR) in accordance with a hierarchical rank order-preserving rule designated for the directory tree (e.g., a rule that requires any given non-root directory to have a lower MR than its parent). In some implementations, for example, an integer value may be selected as a move rank, and may be stored together with other metadata of a given directory (e.g., in or with an "inode" structure or the logical equivalent of an inode) at the time that the directory is created. In other implementations, other data types may be used for MRs: e.g., real numbers may be used, or any other data type for which comparison and value manipulation operations that can be used to enforce the order-preserving rule are supported may be used. In some embodiments, a "parent-higher" MR-order-preserving rule (MOPR) may be used for all the file systems for which concurrent directory moves are to be supported, such that all children directories are assigned lower MRs than their parent directories. In other embodiments, a "child-higher" MOPR may be used for all the file systems, such that all children directories are assigned higher MRs than their parent directories. In yet other embodiments, different MOPRs may be used for different file systems—e.g., the parent-higher MOPR may be selected for one file system FS1, while the child-higher MOPR may be designated for a different file system FS2. In much of the subsequent description, the parent-higher MOPR is used as an example to illustrate the concepts that may be used, and the operations that may be performed, to implement concurrent moves. The same end result (higher concurrency for directory moves) may be achieved using the child-higher MOPR as well in some embodiments, with slight variations in the details of the lower-level operations that are performed. From a mathematical perspective, the parent-higher and child-higher MOPRs may be considered isomorphic. That is, for example, if the MRs of a given file system for which the parent-higher MOPR is being used were all simply multiplied by −1, the same types of MR modifications may be required to implement a directory move with the child-higher MOPR as would have been required with the parent-higher MOPR before the transformation of the MR values. Generally speaking, the same types (and roughly the same amount) of computations (with some minor arithmetic changes) that are needed to enforce the parent-higher MOPR may be required for enforcing the child-higher rule.

A file system implementation may comprise one or more administrative or control-plane components in some embodiments, collectively referred to herein as the "metadata manager" of the file system. As indicated by the name, the metadata manager may be responsible for various types of operations associated with file system metadata, such as selecting the MOPR to be used for a file system, assigning the MRs to directories, receiving and responding to directory move requests, and so on. The metadata manager may be responsible for handling metadata operations for multiple file systems (e.g., file systems FS1, FS2, etc.), each with its own root directory and directory tree. Individual file systems, each created in response to a distinct create command (such as the "mkfs" command in Unix™/Linux-based environments) may sometimes also be referred to as "file system instances." Different file systems may be set up for different applications, for example, or for respective groups of clients. At least in some embodiments, MRs assigned to different directories within a file system may not be required to be unique, as long as the MOPR is enforced—e.g., two different directories in different sub-trees may have the same MR assigned to them. In other embodiments, the metadata manager may be configured to enforce uniqueness of MRs within a given file system.

In various embodiments, a given directory move request (DMR) may indicate a source directory (SD) (the directory to be moved or renamed) and a proposed parent directory (PPD) (to which the SD is to be added as a child). For example, in Unix-based or Linux-based systems, the "mv /a/b /c/d" command may be issued by a file system client, where "b" is the SD and "d" is the PPD, while in Windows-based systems, the equivalent "move" command (e.g., "move \a\b \c\d" may be issued). Upon receiving an indication of such a DMR, a particular thread of execution (or process) of the metadata manager may perform a sequence of one or more directory-pair operations in some embodiments to either successfully complete the requested move, or to determine that the requested move would result in a loop in the directory tree and is therefore not permitted. In each of the directory-pair operations, the MRs assigned to a pair of directories (a proposed-parent-and-child pair, or an existing parent-and-child pair) may be examined, and, depending on the results of the examination, zero or more of the two directories' MRs may be modified. The directory-pair operations may be referred to as DPOs herein. The thread of execution responsible for implementing the response to a given DMR may be referred to herein as the "moving thread" for that DMR. In at least some embodiments, each of the directory-pair operations may be performed as an atomic operation or transaction. For example, the logical equivalent of a lock may be obtained on both directories' metadata at the start of the directory-pair operation so that the metadata cannot be modified by any other thread until the directory-pair operation is completed. In some implementations, each directory's metadata (or at least the MR of the directory) may be protected by a respective lock, and the atomicity of the directory-pair operations may be achieved by using such locks. In other implementations, an optimistic concurrency control mechanism that does not require multiple per-directory locks to be acquired by the thread may be used as described below in further detail. The metadata manager may designate or instantiate a respective moving thread for each DMR received in at least some embodiments, and the moving threads for multiple DMRs may proceed in parallel with their directory-pair operations, thus enabling processing for a plurality of directory moves to be performed in parallel. Unlike in some file system implementations, file-system-level locks may not be required for directory moves when the move-rank based approach is employed in various embodiments. In some embodiments, a given moving thread may be re-used for, or assigned to perform, several different move operations. Under some conditions, the technique for implementing directory moves described herein may be used without enforcing atomicity for the directory-pair operations in various embodiments. For example, in one implementation, a file-system-level lock may be acquired, and the DPO-based approach may be used (e.g., primarily because it provides an efficient mechanism for detecting file system loops) without requiring the DPOs to be implemented as atomic operations. In another implementation, if it is known that no more than one directory move is going to be requested concurrently within a given sub-directory tree (as may be the case if only one user is granted permissions to move/rename directories within that sub-tree) or within the file system as a whole, atomicity for some or all of the DPOs may not be required.

Consider an example scenario in which the parent-higher MOPR is in use for a file system FS1, and each directory is assigned an integer MR. A DMR specifying an SD and a PPD of FS1 is received. In the first DPO performed in response to the DMR, in at least some embodiments the moving thread may examine and compare the MRs of the SD and PPD. Two possibilities exist with respect to the result of the comparison: either the SD has a lower MR than the PPD (e.g., the SD has an MR of 100, and the PPD has an MR of 200), or the SD has an MR at least as high as the MR of the PPD (e.g., the SD's MR is 300, and the PPD's MR is 250).

If the SD has a lower MR (e.g., 100) than the PPD (e.g., 200), the SD can be added as a child of the PPD without violating the parent-higher MOPR. Accordingly, the metadata of the file system may be modified to make SD the child of the PPD (e.g., as part of the same atomic operation in which the two MRs are examined), and the move operation may thereby be completed successfully without modifying any MR values. Given that the parent-higher MOPR is in use in the example scenario, the fact that the SD has a lower MR than the PPD may also guarantee that no loop would be formed by making the SD a child of the PPD. In at least some embodiments, a first DPO of a set of one or more DPOs implemented by the moving thread may represent one of two types of DPOs in which no MR modification is attempted. (As discussed below, a DPO in which a file system loop is identified may represent the other type of DPO in which no MR modifications are attempted.)

If the SD's MR (e.g., 300) is not lower than the MR of the PPD (e.g., 250), the SD cannot be added as a child of the PPD without violating the parent-higher MOPR. Furthermore, if the SD's MR is not lower than the PPD's MR, in the general case the metadata manager may not be able to assume that the addition of the SD as a child of the PPD is legal—for example, it may be the case that the SD is actually part of the directory path between the PPD and the root directory of FS1 and that a loop would occur in the directory tree if the requested move were allowed. (In one trivial case (e.g., when a request such as "mv /a /a" is received), the MR of the PPD may be the same as that of the SD, and the DMR may be immediately rejected as illegal.)

In general, if the SD cannot currently be made a child of the PPD, the moving thread may determine a tree traversal direction in which changes to one or more MRs are to be attempted, with the objective of making enough MR changes until the SD can be added as a child of the PPD without violating the MOPR. For example, if the PPD's current MR is 250 and the SD's current MR is 300, the moving thread may try to increase the PPD's MR to 350 (in a DPO in which the PPD's parent directory's MR is examined with the PPD's MR to ensure that the increase to 350 does not violate the MOPR) or decrease the SD's MR to 200 (in a DPO in which the MRs of the SD and its child directories (if any) are examined for possible MOPR violations). The exact amount by which an MR is to be modified (which may be referred to as "MRDelta" or "rank-delta" herein) may be determined based on various criteria and/or heuristics in different embodiments—e.g., based on the differences in the MRs of the pair of directories that triggered the change, on a default MR differential used for adjacent levels of the directory tree, randomization factors, and so on. In one implementation, the minimum possible change that results in compliance with the MOPR may be applied—e.g., if the SD's current MR is 300, an attempt to set the PPD's MR to 301 may be made, regardless of the PPD's original MR setting. Of course, if a loop is encountered during the set of attempted MR changes, the move request may be rejected as illegal.

Thus, the set of DPOs implemented may result in one of two possible termination statuses being determined for the requested move operation in at least some embodiments: (a) a tentative-success status (indicating that enough MR changes have been made to have a high probability of adding the SD as a child to the PPD without violating the MOPR) or (b) a failure status (indicating that a loop has been detected and the request is therefore to be rejected). The first of these status options may be designated as "tentative-success" rather than just "success" because in some (typically rare) circumstances, it may be the case that by the time all the DPOs are completed, the SD's own MR may have been modified (due to a different concurrent rename request, for example), and as a result the SD may still not be added as a child of the PPD without violating the MOPR. In such a scenario, the rename operation may be retried after a delay, as discussed in further detail below with respect to FIG. 7. In practice, in the majority of cases of "tentative-success" status, the probability that the SD's MR has changed sufficiently to require another round of modifications may be quite low in various embodiments.

Each MR change may be implemented as part of a respective atomic DPO in at least some embodiments, with a new DPO being triggered if the MR change being attempted in the current DPO would violate the MOPR. If the parent-higher MOPR is being enforced, for example, the moving thread may decide to either (a) increase the MRs of the PPD and other directories on a path towards the root if necessary or (b) decrease the MRs of the SD and its children on the paths towards the leafs of the sub-tree rooted at the SD. The total number of MRs that may have to be changed may vary from case to case. For example, if the moving thread attempts to increase the MR of the PPD (in a DPO that involves examining the MRs of the PPD and the PPD's parent, when the tree traversal direction is towards the root), it may turn out to be the case that the MR of the PPD cannot be increased by the desired amount until the PPD's parent's MR is increased. As a result, the modification of the current DPO may be deferred until at least the PPD's parent's MR is changed. The change required to the PPD's parent's MR may be termed a "prerequisite modification" to the currently-attempted modification of the PPD in such a scenario, and the prerequisite modification may require its own corresponding prerequisite DPO (involving the next directory on the path towards the root, and the PPD's parent). A given move operation may require a plurality of prerequisite modifications to be applied before the SD can be added as a child of the PPD in some cases—in the worst case, for example, all the MRs up the path to the root may have to be changed, or all the MRs along one or more paths to the leafs may have to be changed. In practice, the number of cascading MR changes needed for a given directory move operation may typically be kept quite low in various embodiments.

As it moves up or down the directory tree performing its pairwise operations, the moving thread may check during any given DPO for the possibility of loop formation (taking the cumulative set of operations corresponding to the currently-implemented directory move operation into account). If the SD is encountered at any other level of the tree or in any other DPO than the initial DPO, for example, this would indicate a loop, and the directory move request may be rejected as illegal.

Figure 2:
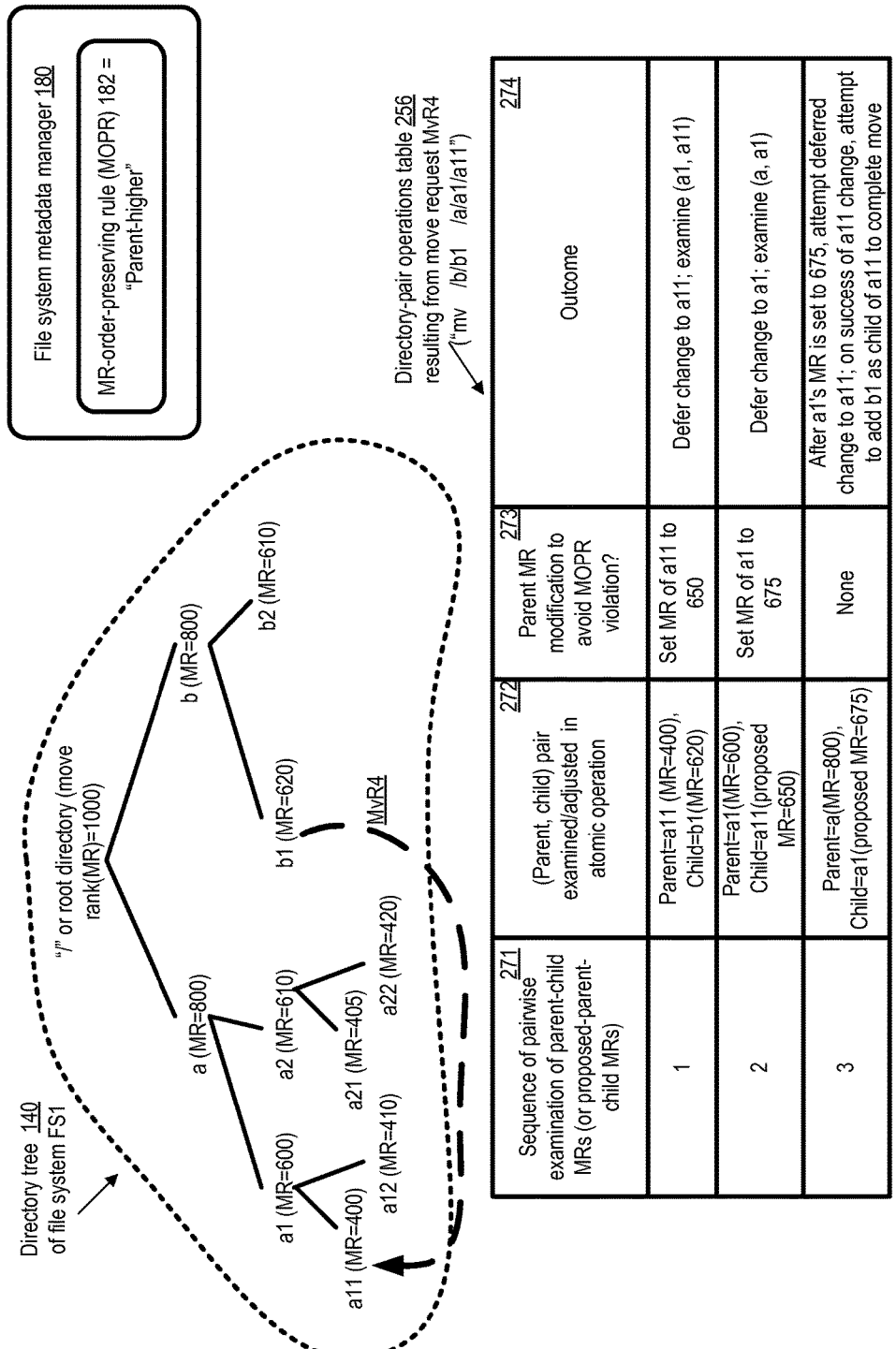
FIG. 2 illustrates an example of a move request that may involve modifications to move ranks of multiple directories, according to at least some embodiments.

As mentioned above, some MR modifications may be deferred in various embodiments until their prerequisite MR modifications are completed. In some embodiments, a LIFO (last-in-first-out) data structure such as a stack may be used to store representations of deferred MR modifications (or the corresponding DPOs), and the deferred modifications may be completed in reverse order after their prerequisites are completed. An example of a directory move that requires deferred MR modifications is shown in FIG. 2 and described below in further detail.

Examples of Move Operations Implemented Using Rank Values

FIG. 1 illustrates an example file system metadata manager configured to support directory move operations using respective move ranks assigned to the directories of the file system, according to at least some embodiments. A simple example of a directory tree 140 of a file system FS1 is illustrated, together with a decision table 156 indicating the outcomes of three examples of directory move requests. The metadata manager 180 of FS1 may enforce the "parent-higher" MR-order-preserving rule 182 in the depicted embodiment.

The MRs assigned to the different directories prior to the time that any of the directory move requests (MvRs) MvR1, MvR2 or MvR3 is received are shown in the tree 140. The root directory ("/") is assigned an MR of 1000 and its child directories /a and /b are both assigned MRs of 800. In /a's sub-tree, /a/a1 is assigned an MR of 600, /a/a2 is assigned an MR of 610, /a/a1/a11 is assigned an MR of 400, /a/a1/a12 is assigned an MR of 410, /a/a2/a21 is assigned an MR of 405, and/a/a2/a22 is assigned an MR of 420. In /b's sub-tree, /b/b1 is assigned an MR of 620, and /b/b2 is assigned an MR of 610. In at least some embodiments, an initial MR may be assigned to a directory by the metadata manager 180 at the time the directory is created, e.g., using some range of acceptable values and various settings for the initial MR differences between levels of the tree.

Assume, for ease of explanation, that the three move operations are requested in isolation—that is, each is directed to the tree 140 as shown. Column 171 indicates the source directory for each move, while column 172 indicates the proposed parent directory of the move. The full paths to the directories are shown in columns 171 and 172 (in general, the same directory name such as "a11" may be used at different levels of a directory tree, and the full path name helps to disambiguate between such directories). Two kinds of decision results are illustrated in table 156 for each of the three requested move operations. The first decision (in column 173) is regarding whether any MRs may need to be modified to enable the move to complete successfully, and may be based on a comparison of the MRs of the SD and the PPD in a first directory-pair operation performed by the metadata manager for the move. The second decision (in column 174) concerns the legality and the corresponding termination status of the requested move—e.g., a move is considered illegal in the depicted embodiment if it would result in a loop in the directory tree, and legal otherwise. Note that very simple examples of move operations (and a very small directory tree) have been chosen for inclusion in FIG. 1 to illustrate the concepts of the rank-based directory move implementation techniques without having to include long sequences of directory-pair operations (DPOs).

In move request MvR1, the SD is /a/a2/a22, which has an MR of 420. The PPD is /b/b2, which has an MR of 610. In its first (and only) DPO required for MvR1, the metadata manager 180 may examine the MRs of /a/a2/a22 and /b/b2, and determine that the SD can be added as a child of the PPD without any MR modification since 620 is higher than 420 (as indicated in column 173). Furthermore, as indicated in column 174, the metadata manager may conclude that no loops would arise in the directory tree of FS1 if MvR1 were implemented, since the SD is not re-encountered during the DPOs for the move. The SD may be added as the child of the PPD, e.g., by making the appropriate changes to FS1 metadata (such as changing the appropriate child-to-parent and/or parent-to-child pointers within the same atomic operation in which the MRs of the SD and PPD are examined), and MvR1 may be completed successfully.

In MvR2, the SD is /b/b1 with an MR of 620, while the PPD is /a/a1 an MR of 600. Accordingly, in view of the parent-higher MOPR in use, the metadata manager 180 may determine that at least one MR change is needed (as indicated in column 173) in its first DPO, and may for example choose to apply the changes in a towards-root traversal of tree 140. Since b1's MR is higher, the metadata manager may attempt to change the MR of a1 (e.g., to 630, 700, or some other value, with the exact amount of increase being determined based on various factors such as the difference between 620 and 600, the typical difference between MRs at adjacent levels of the tree, and so on). In order to implement the MR change, a second DPO may be required with respect to the directory-pair (/a, /a/a1) to check whether the proposed change to a1 would violate the MOPR. If the change (e.g., to 630 or 700) does not violate the MOPR, the value of a1's MR would be modified, e.g., within the second DPO, and then b1 may be added as the child of a1 in a third DPO in the depicted embodiment to complete the requested rename. (In an alternative approach in which MRs are modified in a towards-leaf traversal, the MR of b1 may be reduced by some selected MRDelta amount to comply with the MOPR.)

In MvR3, the SD is /a and the PPD is /a/a1/a12. In the first DPO, the metadata manager 180 may determine that one or more MR changes are required (as indicated in column 173), since a's MR exceeds that of a12. If a towards-root approach were being used for MR modifications, it would then determine an MRDelta amount by which a12's MR should be increased (e.g., by adding 700 to a12's current MR). In order to check whether the proposed change is viable, a DPO with a1 and a12 as the directory pair would be attempted, which may in turn trigger another DPO (with a1 and a as the directory pair). In this example scenario, the directory "a" would be encountered twice—once as the SD and once in the set of DPOs attempted by the metadata manager, and as a result a loop would be detected. MvR3 would therefore be rejected due to a detection of a file system loop in the depicted embodiment, as indicated in column 174. If the towards-leaf approach were used instead, the PPD would be encountered again (as attempts to modify all the child directories of "a" were made), and a loop would also be found, resulting in the rejection of the move request.

The examples of successful move operations shown in FIG. 1 (MvR1 and MvR2) did not involve changes to more than one MR. FIG. 2 illustrates an example of a move request that may involve modifications to move ranks of multiple directories, according to at least some embodiments. The same directory tree 140 that was used to discuss the move operations of FIG. 1 is re-used in FIG. 2, and the metadata manager 180 once again implements the parent-higher MOPR. In addition, for the purposes of illustration, the metadata manager 180 is assumed to change MRs in a towards-root traversal of the tree 140 in the depicted embodiment.

An indication of a directory move request MvR4 equivalent to "mv /b/b1 /a/a1/a11" is received by the metadata manager, with b1 as the SD and a11 as the PPD. The set of DPOs attempted by the metadata manager in response to such a request is illustrated in table 256. In the depicted embodiment, the sequence in which the operations are attempted is from top to bottom of table 256, as indicated in the sequence column 271. In at least some scenarios, especially if towards-leaf MR traversals are used for MR modifications, it may be possible to perform some DPOs in parallel with others (e.g., DPOs for disjoint sub-trees may be attempted in parallel), in which case strict sequencing of the kind shown in table 256 may not be enforced. In the first DPO, the metadata manager examines the MRs of b1 (as child) and a11 (as proposed parent), as indicated in column 272. Since the child's MR (620) is higher than the proposed parent's (400), the metadata manager determines that an attempt to increase a11's MR, e.g., to 650 as indicated in column 273 (the exact amount of increase may differ based on the heuristics being used by the moving thread). However, before a11's MR can be changed, the MR of its parent (a1) may have to be examined in a second DPO. The proposed increase to 650 may be deferred until this second DPO is completed, as indicated in column 274.

The second DPO with (a1, a11) as the directory pair and the increase of a11's MR to 650 as the proposed change may then be initiated, as indicated in the next row of table 256. In this DPO, the metadata manager may determine that since a1's MR is currently lower than the proposed MR of a11, a third DPO is needed to increase a1's MR to, say 675 (as indicated in column 273). The second DPO's change may also be deferred (as indicated in column 274) pending the conclusion of the third DPO.

The third DPO, in which the directory pair is (a, a1) as indicated in the final row of table 256, may indicate that the proposed increase of a1's MR to 675 is permissible (since a's MR is higher than 675) without requiring additional new DPOs towards the root of the tree 140 being scheduled. In such a scenario, the metadata manager may determine that the termination status of Mv4 is to be set to "tentative-success", since all the changes needed to allow the PPD to be made the parent of the SD without violating the MOPR appear to have been made. After a1's MR is set to 675, the deferred DPOs may be attempted in reverse order in the depicted embodiment (as indicated in column 274). First, for example, a second attempt to set a11's MR to 650 may be made. This attempt may succeed, since a1's MR is now higher than 650. After a11's MR is successfully set to 650, the original DPO involving the SD and the PPD may be re-attempted. Unless the SD's MR has increased beyond 650 in the interim period while the other DPOs were implemented (typically an unlikely event), the original requested directory move operation may be completed successfully by adding the SD as the child of the PPD. In some extremely rare scenarios one or more deferred MR modifications may no longer be permissible (due to changes resulting from other concurrent moves), in which case the original move operation may be re-attempted after a delay, in a manner similar to that discussed below with reference to FIG. 7.

Directory Tree Traversal Direction Alternatives

In some embodiments, a metadata manager may select the particular move-rank-order-preserving rule to use (e.g., for a given file system or for all file systems managed by it). In addition to the decision as to whether parent directories are to have higher MRs assigned to them than child directories, or child directories are to have higher MRs than their parents, the metadata manager may also select various other parameters of the procedures to be used with respect to directory move operations, such as the direction in which directory trees are to be traversed during the DPOs resulting from a given move request, the techniques to be used to select rank-delta values (the amounts by which MRs are to be changed), and so on.

Figure 3:
FIG. 3 illustrates example combinations of rank-order-preserving rules and directory tree traversal directions, according to at least some embodiments.

FIG. 3 illustrates example combinations of move-rank-order-preserving rules (MOPRs) and directory tree traversal directions, according to at least some embodiments. As shown in table 301, either of two types of MOPRs may be selected for any given file system in various embodiments: parent-higher (box 305) or child-higher (box 320), indicating the requirements for the relative values of MRs in all the parent-child directory relationships within a given file system. As mentioned earlier, in general the parent-higher and child-higher MOPRs may be equivalent in terms of the amount of work and the kinds of operations required for rule enforcement (except for slight changes in the arithmetic involved). For either MOPR, the metadata manager may decide whether towards-root tree traversals are to be performed when adjusting the MR values considering one pair of directories at a time, or whether towards-leafs (away-from-root) traversals are to be performed. The direction (i.e., increase or decrease) of the MR modifications attempted may differ for a given traversal direction, based on the MOPR in use. As shown in box 307, if the parent-higher MOPR is in use and the tree is traversed towards the root, the MRs may be increased, while as shown in box 309, attempts to decrease the MRs may be made if the combination of (parent-higher MOPR, towards-leafs traversal) is employed. If the (child-higher, towards-root) combination is used, the moving thread may attempt to decrease the MRs of the directories encountered (box 327), and if the (child-higher, towards-leafs) combination is employed, the moving thread may attempt to increase the MRs of the encountered directories (box 329).

In various embodiments, generally similar net results with respect to directory renaming concurrency may be achieved, regardless of the particular combination of MOPR and tree-traversal direction that is selected, as long as all the moving threads for a given file system employ the same combination. In at least one embodiment, the metadata manager may collect statistics or metrics on the directory rename operations that are attempted in various file systems, such as the distributions of the tree depths of the SDs and the PPDs, the average number of DPOs required for renames as a function of those tree depths, and so on. The metadata manager may use such collected metrics (e.g., in combination with a machine learning technique) to select the optimal combination of MOPR and tree-traversal direction for a newly created file systems. If most file systems are relatively deep, but most SDs and PPDs are positioned very near the leafs, it may be advantageous to use towards-leafs tree traversals instead of towards-root tree traversals, for example.

File System Architecture Alternatives

Figure 4:
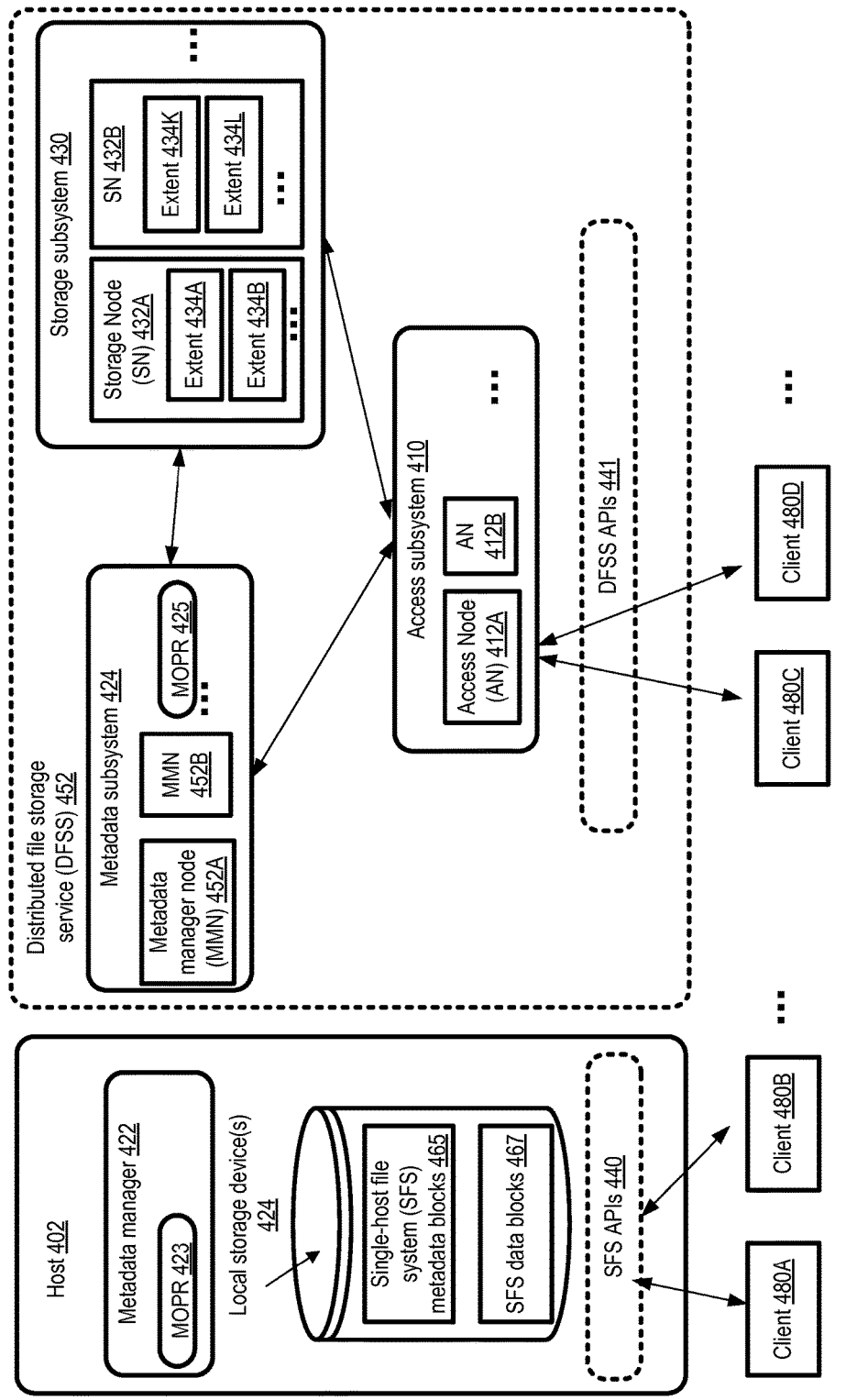
FIG. 4a and FIG. 4b illustrates examples of single-host file systems and distributed file systems, respectively, at which move ranks may be used to implement concurrent directory moves, according to at least some embodiments.

The rank-based directory moving techniques discussed above may be applied to a broad variety of file systems. FIG. 4a and FIG. 4b illustrates examples of single-host file systems and distributed file systems, respectively, at which move ranks may be used to implement concurrent directory moves, according to at least some embodiments. In the embodiment shown in FIG. 4a, a particular host 402 may be used for all the data and metadata of a file system that is used by a plurality of clients such as 480A and 480B. The host 402 may include a metadata manager 422A (e.g., a set of one or more processes or threads) that enforce one or more MOPRs 423. File contents (e.g., data blocks 467) as well as metadata content (such as metadata blocks 465 comprising structures within which MRs are located) may be stored at the local storage devices 424 of the host 402 in the depicted embodiment. A set of single-host file system (SFS) interfaces (e.g., application programming interfaces or APIs 440) may be implemented to enable clients such as 480A or 480B to submit directory move requests as well as other file system-related operation requests.

At a different end of the file system complexity spectrum, rank-based directory move techniques may be applied equally successfully in large cloud-scale storage services in some embodiments, such as a distributed file storage service (DFSS) 452 of FIG. 4b. As shown, DFSS 452 may be logically divided into at least three subsystems: a storage subsystem 430, a metadata subsystem 420 and an access subsystem 410. Each subsystem may comprise a plurality of nodes, such as storage nodes (SNs) 432A and 432B of storage subsystem 430, metadata manager nodes (MMNs) 452A and 452B of metadata subsystem 420, and access nodes (ANs) 412A and 412B of the access subsystem 410. Each node may, for example, be implemented as a set of processes or threads executing at a respective physical or virtualized server in some embodiments. The number of nodes in any given subsystem may be modified independently of the number of nodes in the other subsystems in at least some embodiments, thus allowing deployment of additional resources as needed at any of the subsystems (as well as similarly independent reduction of resources at any of the subsystems). The MMNs may collectively enforce the MOPRs 425 selected for different file systems instantiated at the distributed file storage service. Each MMN may be responsible for managing metadata-related operations for portions or all of one or more file systems in the depicted embodiment. In some cases, a directory-pair operation (DPO) of the kind discussed earlier may involve interactions or coordination between at most two different MMNs in the depicted embodiment (in the case where one MMN manages the metadata of the parent or proposed parent directory of the pair, and a different MMN manages the metadata of the child or proposed child). In many cases, the same MMN may manage both directories of the directory pair, so inter-MMN coordination may not be required.

In the depicted embodiment, the storage nodes 432 may be responsible for storing extents 434 (such as extents 434A and 43B4 at storage node 432A, and extents 434K and 434L at storage node 432B), e.g., using some combination of SSDs and rotating disks. An extent, which may for example comprise some number of gigabytes of (typically but not always) contiguous storage space at some set of physical storage devices, may represent a unit of storage replication in some embodiments—thus, a number of physical replicas of any given logical extent may be stored. Each extent replica may be organized as a number of physical pages in some embodiments, with the pages representing the smallest units in which reads or writes are implemented within the storage subsystem. A given file system object (e.g., a file or a metadata structure that may be used for storing MRs) may be organized as a set of logical blocks, and each logical block may be mapped to a set of pages within a data extent. Metadata for the file system object may itself comprise a set of logical blocks (potentially of different sizes than the corresponding logical blocks for data), and may be stored in pages of a different extent 434. Replicated state machines may be used to manage updates to extent replicas in at least some embodiments. In at least some embodiments, an optimistic concurrency control mechanism may be used to manage reads and writes in the DFSS 452. In some cases, the MRs for the two directories involved in a given DPO may be mapped to different metadata extents 434, while in other cases the MRs (and/or other metadata) for the two directories may be mapped to the same extent. In some implementations, operations directed to each metadata extent may be handled by a different MMN 452, and as a result two MMNs may have to cooperate to implement a DPO that involves MRs located at separate extents.

The access subsystem 410 may present one or more file system interfaces to clients (e.g., clients 480C or 480D), such as DFSS APIs 441 in the depicted embodiment. In at least some embodiments the access subsystem nodes 412 may represent service endpoints established within the appropriate network fabric that is concurrently being used by clients 480. ANs 412 may authenticate an incoming client connection, e.g., based on the client's network identity as well as user identity; in some cases the ANs may interact with identity/authentication services similar to Active Directory Service or Kerberos. In some embodiments the access subsystem may be considered a largely stateless server fleet that can be scaled up and down as needed. In some embodiments, ANs 412 may cache metadata state pertaining to various file store objects, and may use the cached metadata to submit at least some internal I/O requests directly to storage nodes without requiring interactions with metadata nodes.

In addition to implementing directory moves using the MR-based techniques described above, the metadata subsystem 420 may be responsible for managing various types of file system metadata structures in the depicted embodiment, including for example the logical equivalents of inodes, file/directory attributes such as access control lists (ACLs), link counts, modification times, real file size, logical block maps that point to storage subsystem pages, and the like. In some implementations, MRs may be stored within inode structures for directories; in other embodiments, separate structures may be used for MRs. The metadata subsystem 420 may sequence and coordinate operations so as to maintain desired file system object consistency semantics, similar to as the close-to-open semantics expected by NFS clients. The metadata subsystem may also ensure consistency across operations that may involve multiple metadata elements (in addition to directory moves) such as deletes, truncates and appends. Although the metadata subsystem 420 is logically independent of the storage subsystem 430, in at least some embodiments, persistent metadata structures (including the MRs) may be stored at the storage subsystem. In such embodiments, even though the metadata structures may be physically stored at the storage subsystem, the metadata subsystem nodes may be responsible for such tasks as identifying the particular storage nodes to be used, coordinating or sequencing storage operations directed to the metadata, and so on. In at least some embodiments, the metadata subsystem may reuse some of the state management techniques employed by the storage subsystem in some embodiments, such as the storage subsystem's consensus-based state replication machinery, distributed transaction support, and so on. Generally speaking, similar types of directory move-related rules (e.g., MOPRs) and parameters (e.g., directory tree traversal directions, MRDelta selection policies, and the like) may be used at a given file system in various embodiments, regardless of whether the distributed architecture of FIG. 4b is used or the single-host architecture of FIG. 4a is used.

Methods for Implementing Concurrent Directory Moves

Figure 5:
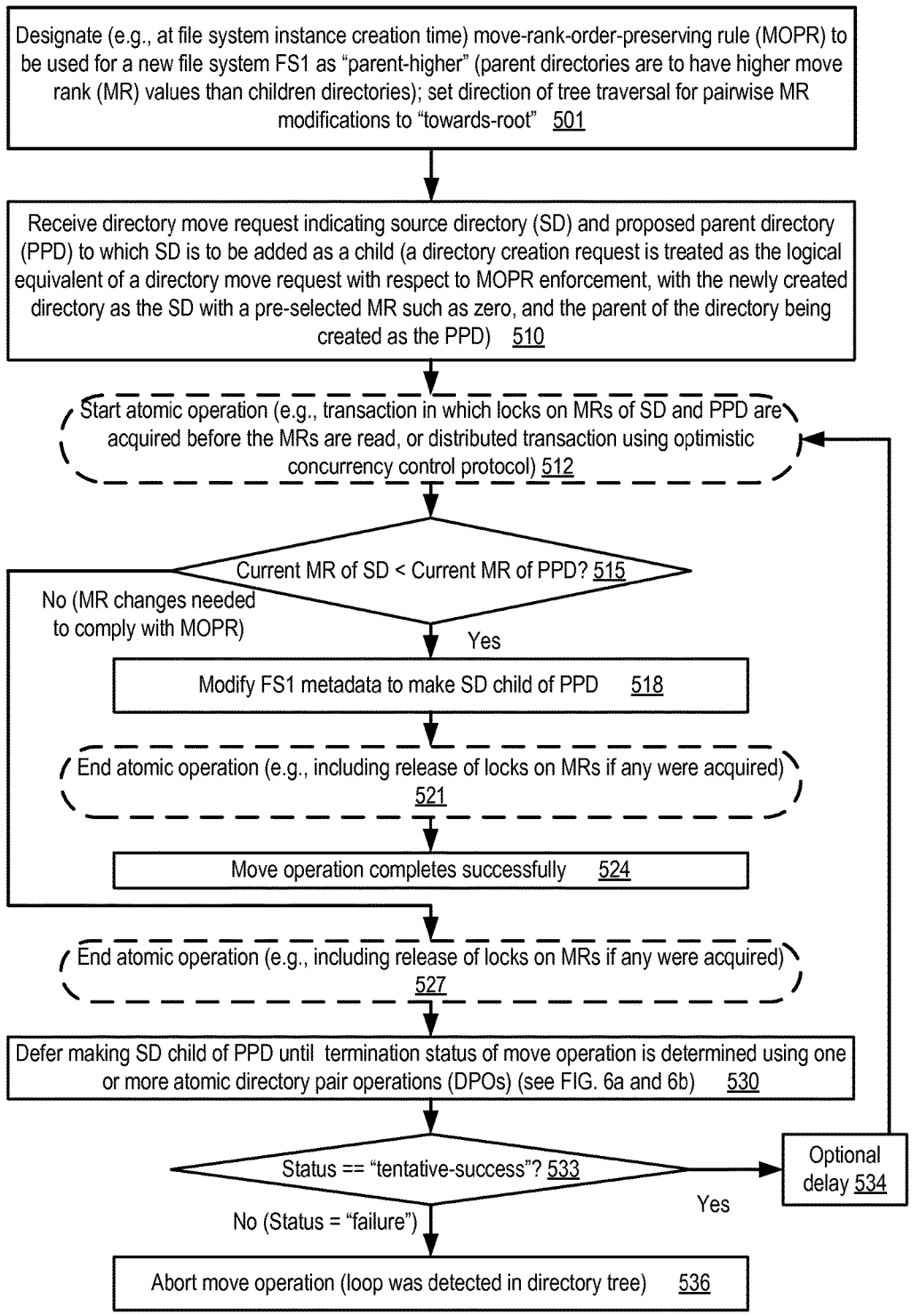
FIG. 5 is a flow diagram illustrating aspects of operations that may be performed by a file system metadata manager to enable concurrent directory move operations, according to at least some embodiments.

FIG. 5 is a flow diagram illustrating aspects of operations that may be performed by a file system metadata manager to enable concurrent directory move operations, according to at least some embodiments. By way of example, in the embodiment depicted in FIG. 5, the parent-higher MOPR is designated for a given file system FS1, and the tree traversal direction is set to towards-root. In the depicted embodiment, the following approach may be used with respect to move ranks in the context of directory creation. When a request to create a new directory is received (e.g., "mkdir /a/b", in which a new directory "b" is to be created as a child of an existing parent directory "a"), the metadata manager of the file system may assign a pre-selected initial MR (such as zero) to the directory being created ("b" in the example being considered). After the initial MR is assigned, the directory creation may be treated (with respect to enforcing the MOPR) as the equivalent of a move request with the newly-created directory as the source directory, and the parent of the newly-created directory as the proposed parent directory of the move. Thus, in the above example, the creation of directory "b" may sometimes lead to an increase in the ranks of one or more directories potentially including the parent "a" and the root directory "l" when the (parent-higher, towards-root) combination is used. In at least some embodiments, the creation of all directories (including the root directory) of a file system may be treated in the same way with respect to MRs, and no special treatment may be required for the root or any other directory. In one such embodiment, all directories including the root directory may be initially assigned an MR of zero, and the root's MR may be increased when new directories are added under it. In other embodiments, the root directory may be treated differently from the others, for example by assigning it the highest possible MR (e.g., the maximum integer value supported, or the logical equivalent of infinity). The MRs of the directories may be stored in a persistent metadata repository for the file system (e.g., using one or more extents at the storage nodes of a distributed architecture similar to that of FIG. 4b, or within file system metadata blocks of local storage devices of the kind shown in FIG. 4a). In some implementations in which inode-like structures are used for file system objects, the MRs may be stored with or in the inode structures.

An indication of a directory move request specifying a source directory (SD) and a proposed parent directory (PPD) (to which the SD is to be added as a child) may be received (element 510) by the metadata manager. (As discussed above, with respect to enforcement of MOPRs, a directory create operation may be handled as a directory move with the new directory as the SD with an MR assigned by the metadata manager, and its parent directory as the PPD. Of course, the creation of a new directory may also involve other changes that may not be required for moves of existing directories, such as the initialization of a new inode structure or the equivalent.) Any of a variety of commands or requests (e.g., the "mv" command or the "move" command) may be issued by a client of the file system to indicate the operands of the desired move in different embodiments. In the depicted embodiment, a moving thread may be selected or instantiated for the current move request at the metadata manager. The moving thread may be responsible for performing all the remaining operations required to respond the rename request (e.g., the operations of FIG. 5, FIG. 6a and FIG. 6b) in some embodiments. The moving thread may initiate a first atomic operation or transaction in response to the request (element 512). In some embodiments, respective locks may be established by the metadata manager to protect the metadata (or at least the MR) of each directory, in which case the atomic operation may include the acquisition of the locks corresponding to the MRs of the SD and the PPD. In order to prevent deadlocks, the locks for any given parent-child pair (or proposed parent-child pair) may be obtained in the same consistent order (e.g., parent lock first, then child lock) for all directory move requests for FS1 in some embodiments. In at least some embodiments (e.g., when a distributed file storage architecture similar to that of FIG. 4b is used), a distributed transaction mechanism that relies on an optimistic concurrency control protocol may be used instead of the acquisition of respective locks on the SD and PPD.

In the first atomic operation, the MRs of the SD and PPD may be examined and compared to determine whether the SD can be added as a child of the PPD without violating the parent-higher MOPR. If the current MR of the SD is lower than the current MR of the PPD (as determined in element 515), file system metadata (e.g., parent-child pointers or child-parent pointers) may be modified to make the SD a child of the PPD (element 518). The atomic operation may then be concluded (element 521) (e.g., in embodiments in which locks were acquired on the MRs, the locks may be released, while in embodiments in which a distributed transaction mechanism relying on optimistic concurrency control is being used, a distributed transaction may be committed), and the processing of the requested move request may be deemed to have completed successfully (element 524) without requiring any MR changes.

If the MOPR would be violated as a result of adding the SD as a child of the PPD, i.e., if the SD's current MR exceeds or equals that of the PPD (as also determined in element 515), one or more MR modifications may be needed. Furthermore, the moving thread may also need to verify that the requested move is legal, i.e., that the move does not correspond to a loop within the directory tree. As indicated in element 527, the atomic operation started in element 512 may be ended (e.g., by releasing the locks or abandoning the distributed transaction). The moving thread may defer the configuration of the SD as a child of the PPD until a termination status of the move request is obtained using one or more additional directory-pair operations (DPOs). Details of the directory-pair operations that may be implemented by the moving thread at this stage are provided in FIG. 6a and FIG. 6b; as indicated therein, each of several DPOs may itself include an atomic operation in which an attempt to modify an MR of one directory of a pair of directories is made. The set of one or more DPOs may determine whether the MR values of one or more directories of FS1's directory tree (starting with the PPD and traversing the directory towards the root) can be increased to allow the SD to be added as the PPD's child, or whether the requested move is illegal (if a loop would be formed in the directory tree as a result of adding the SD as a child of the PPD).

If the move is legal and the required set of MR changes corresponding to the one or more DPOs is eventually applied, a termination status of "tentative-success" for the move may be determined. The success may be considered tentative rather than absolute in the depicted embodiment because, during the time in which the DPOs are implemented, one or more other directory move operations may have resulted in the increase of the MR of the SD (e.g., by other moving threads designated for other concurrent moves). Thus, it may be the case (typically rarely) that the SD's MR has increased so much in the interim period that the increase to the PPD's MR (achieved in the DPOs) is still insufficient to allow the SD to be added as a child. If the status of the move is "tentative-success", as determined in element 533, therefore, the initially requested move operation may in effect be retried, by once again examining the current values of the MRs of the SD and the PPD in an atomic operation (element 512 onwards). In some embodiments the move may be deferred by a delay interval (e.g., using a random time period or a period obtained using an exponential back-off parameter) as indicated by element 534 and described below in further detail with respect to FIG. 7. In other embodiments, the move may be retried without a delay interval. In many cases, no additional MR modifications may be needed in the depicted embodiment, and the move may complete successfully following the actions corresponding to elements 512-524.

Instead of "tentative-success", a termination status of "failure" may be obtained for the requested move as a result of the DPOs, e.g., if a loop was detected in the directory tree. If the status is "failure", as also determined in element 533, the requested rename may be abandoned/aborted (element 536) in the depicted embodiment.

Figure 6A:
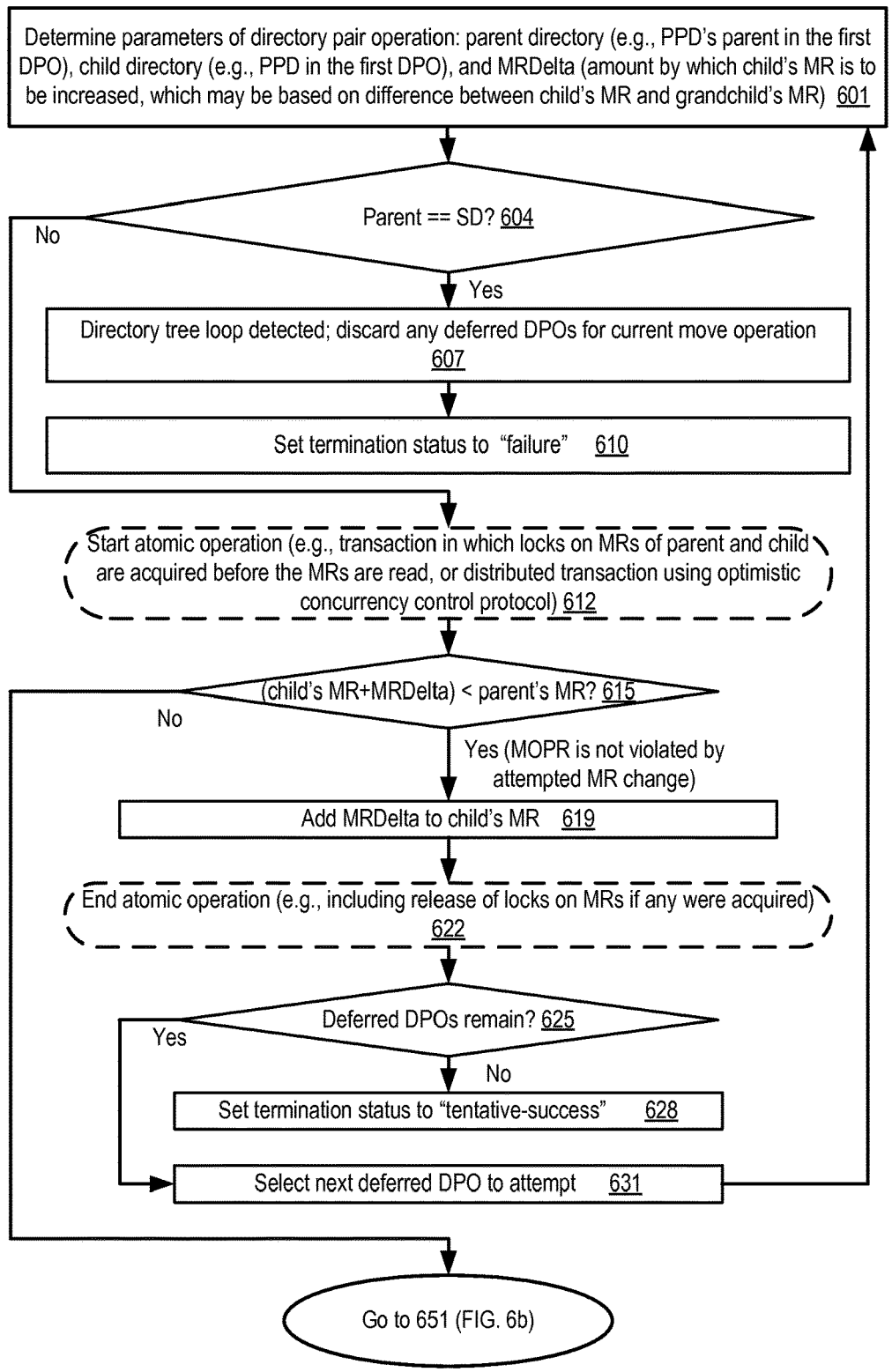
FIG. 6a and FIG. 6b collectively comprise a flow diagram illustrating aspects of directory-pair MR adjustment operations that may be performed by a file system metadata manager, according to at least some embodiments.
Figure 6B:
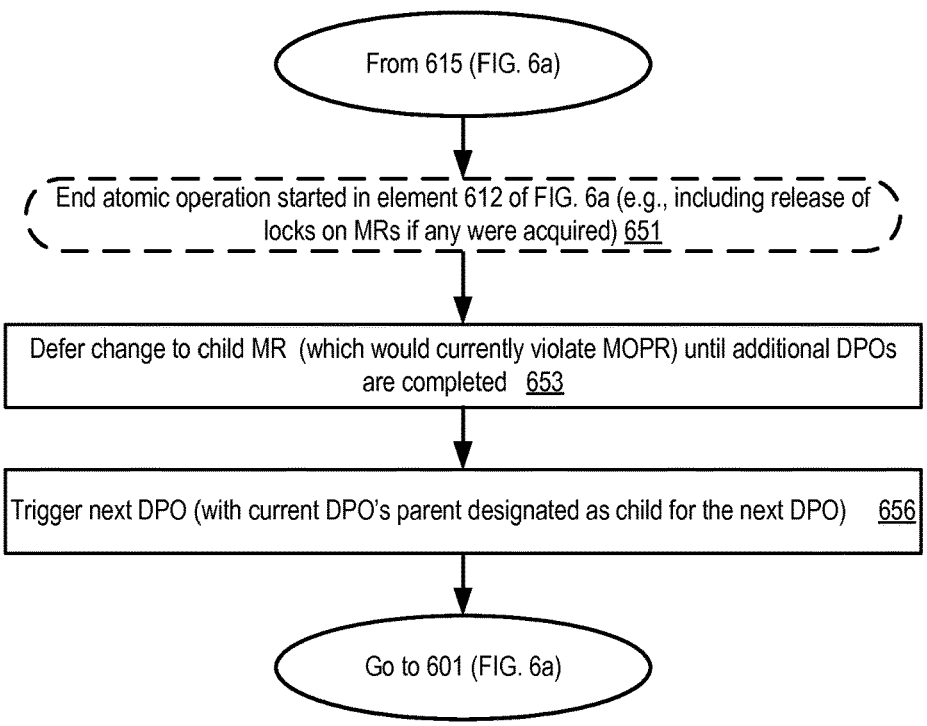

FIG. 6a and FIG. 6b collectively comprise a flow diagram illustrating aspects of directory-pair MR adjustment operations that may be performed by a file system metadata manager, according to at least some embodiments. In some embodiments, the directory-pair operations may be performed by the same moving thread which determined that one or more MR modifications are required (in operations corresponding to FIG. 5, for example). Such directory-pair operations or DPOs may be implemented in scenarios in which the SD of a requested rename operation cannot be added as a child to the PPD without violating the MOPR in use. As in the case of FIG. 5, the operations illustrated in FIGS. 6a and 6b correspond to the case where the parent-higher MOPR is in effect and where the direction of tree traversal for MR adjustments is towards the root, with attempts being made in each directory-pair operation to increase the MR of one of the directories. As shown in element 601, various parameters of the directory-pair operations may be determined: that is, which directory is in the role of parent (or proposed parent), which directory is in the role of the child (or proposed child), and the amount "MRDelta" by which the child's MR is to be increased. In the first directory-pair operation involving an increase to an MR, the PPD would be the child directory in the depicted embodiment, and the PPD's parent would be the parent. A value for MRDelta may be determined based on a variety of factors in different embodiments, such as the difference between the child's current MR and the grandchild's current MR (i.e., the MR of the child's child) which led to the triggering of the current directory-pair operation, heuristics developed by the metadata manager based on collected metrics, and so on. In one embodiment in which positive integers are being used as MRs, a technique that attempts to reduce the probability of running out of integer values for use as MRs may be implemented when changing MR values. In one such technique, all directories may be assigned an MR of zero upon directory creation, and the minimum increase that allows compliance with the parent-higher MOPR may be applied whenever MRs are changed. Thus, for example, in the case of "mkdir /a/b, where "a"'s MR is zero, and the root directory's MR is 1, "b" would be assigned an MR of 0. The metadata manager would then try change "a"'s MR to 1 (the minimum required to comply with the parent-higher MOPR with respect to "b" and "a"), which would in turn lead to the root directory's MR being increased to 2 (the minimum required to comply with the MOPR with respect to "a" and the root directory). Similarly if a PPD had an MR of 10 and the SD's MR was 15, the PPD's MR may be set to 16, the lowest value that can be selected to comply with the parent-higher MOPR, based on the current MR of the SD. By starting with zero MRs for all directories and using minimal MRDeltas, the likelihood that the metadata manager ever runs out of integers may be reduced in comparison to at least some other MR assignment techniques. It is noted that the selection of the initial MR value for directories may be independent of the manner in which MRDeltas are selected. In one embodiment, for example, the minimal MRDelta approach may be used even if the initial MRs assigned to directories are not zero. Conversely, in another embodiment, the minimal MRDelta approach may not be used even though directories are assigned MR values of zero upon creation.

In the embodiment depicted in FIGS. 6a and 6b, the metadata manager may check whether the parent directory among the directory-pair being examined is the same as the source directory indicated in the rename request (element 604). If this is the case, the requested move for which the DPO is being performed is illegal (a loop would be formed if the move were allowed). Accordingly, any deferred DPOs corresponding to the current move may be abandoned (element 607) and a termination status of "failure" may be set at this stage (element 610). Setting the status to failure may lead to the abandonment of the move request as indicated in FIG. 5.

If the parent is not the SD (as also determined in element 604), an atomic operation to attempt to increase the child's MR by MRDelta may be begun (element 612). In various embodiments, the atomic operation may involve acquiring locks on the parent and child MRs of the current pair of directories being examined, or the implementation of a distributed transaction using optimistic concurrency control, as in the case of the atomic operation illustrated in FIG. 5. During the atomic operation begun in element 612, no changes by any other moving thread may be applied to the MRs of the parent and child directories being considered (although MR changes at other parts of the directory tree may be performed by other moving threads on behalf of different concurrent move requests). The MRs of the parent and child may be examined in the atomic operation to check if the addition of the MRDelta value to the child would violate the MOPR. If the addition of the MRDelta would not violate the MOPR (as determined in element 615), the addition may be performed (element 619) within the scope of the atomic operation, and the atomic operation may then be terminated (element 622). Any locks acquired may be released when the atomic operation is ended in the depicted embodiment.

The moving thread may then check whether any DPOs that were deferred earlier (as part of the set of DPOs being implemented for the current move request) remain to be implemented. If no deferred DPOs remain (as determined in element 625), the termination status of the current set of DPOs may be set to "tentative-success", which may lead to the retry of the original move request as illustrated in FIG. 5. If one or more deferred DPOs remain, the next deferred DPO to be attempted may be identified (element 631) and the actions corresponding to elements 601 onwards may be begun for that deferred DPO.

If, in the actions corresponding to element 615, the moving thread determines that the MRDelta addition to the child would violate the MOPR (i.e., that the sum of the child's current MOPR and MRDelta would exceed the MR of the parent), the moving thread may be forced to trigger a new DPO, as indicated in FIG. 6b. As shown in element 651 of FIG. 6b, the atomic operation started in element 612 of FIG. 6a may be ended (with the corresponding locks, if any were acquired, being released). The current DPO may then be deferred (element 653), e.g., by placing a representation of the current DPO's parameters on a stack or similar data structure, until one or more additional DPOs (which collectively allow the MRDelta change to be applied without violating the MOPR, or determine that the requested rename is illegal) are completed. A new DPO, in which the child directory role is filled by the parent directory of the just-deferred DPO, may be triggered (element 656), as the propagation of cascading MR changes proceeds towards the root of the directory tree. The steps of FIG. 6a, starting from element 601 onwards, may then be initiated for the newly-triggered DPO.

In at least one embodiment, as mentioned earlier, some or all of the operations shown being performed atomically in FIG. 5 and FIG. 6 may instead be performed without enforcing atomicity. For example, if concurrent directory moves are not required for a particular file system, the MR-based approach may be used in conjunction with a file system-level locking mechanism, in which case the directory-pair operations themselves need not be atomic.

Figure 7:
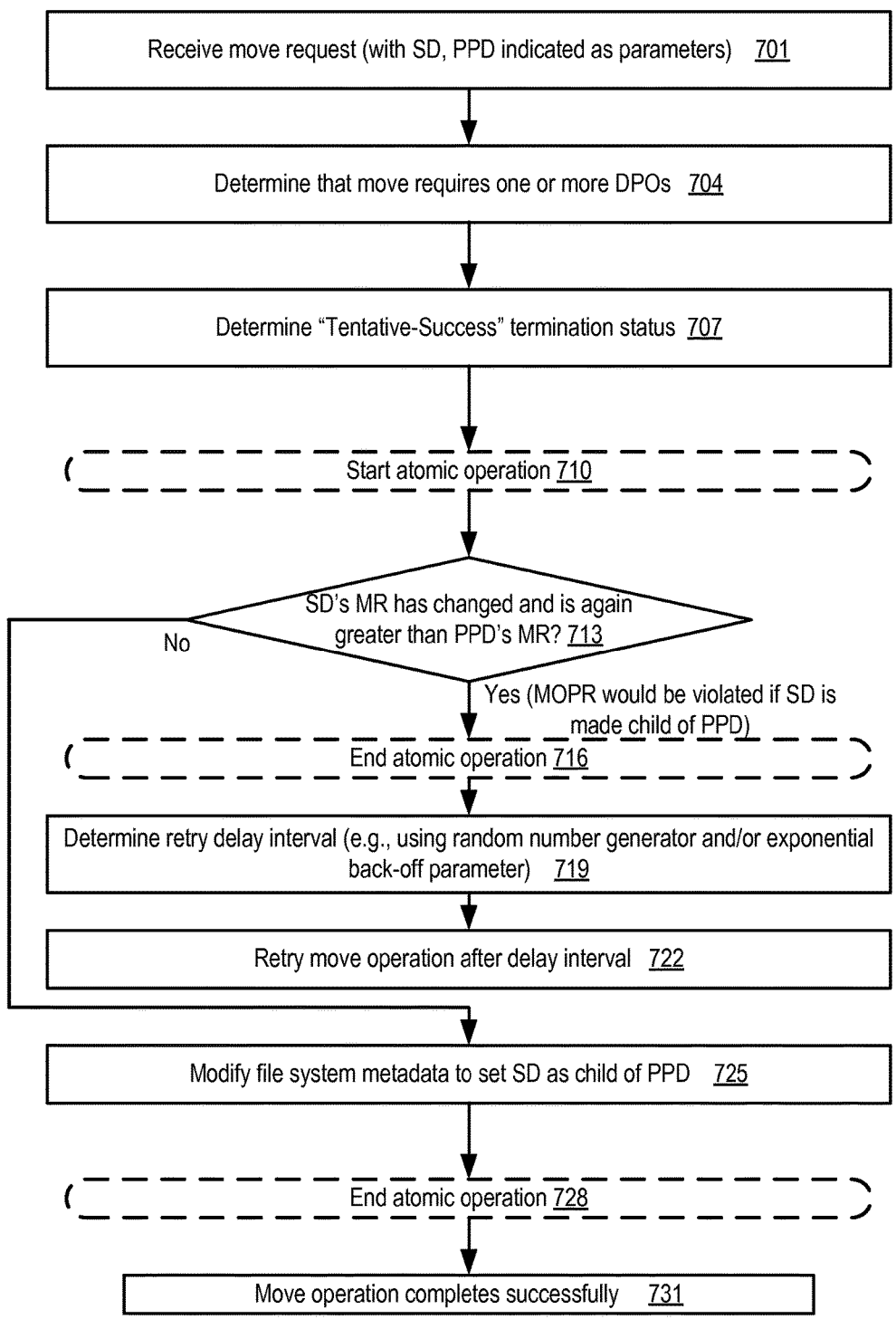
FIG. 7 is a flow diagram illustrating aspects of operations that may be performed by a file system manager in response to determining, subsequent to a completion of a set of directory-pair operations triggered by a directory move request, that the move rank of the source directory of the move has been changed beyond a threshold, according to at least some embodiments.

As mentioned in the context of FIG. 5, in some cases the MR of an SD may have changed during the time it takes to complete the DPOs triggered by the move request. FIG. 7 is a flow diagram illustrating aspects of operations that may be performed by a file system manager in response to determining, subsequent to a completion of a set of directory-pair operations triggered by a directory move request, that the move rank of the source directory of the move has been changed beyond a threshold, according to at least some embodiments. Once again, the parent-higher MOPR and the towards-root traversal option are assumed to be in effect for the operations illustrated in FIG. 7.

As shown in element 701, a directory move request indicating an SD and a PPD may be received. The moving thread assigned to the received request may determine that one or more DPOs are required to determine the termination status of the move (element 704), e.g., because the SD's MR is higher than the current MR of the PPD. The DPOs may result in a determination of a "tentative-success" termination status for the move (element 707). At this point, the moving thread may re-try the original move request in view of the change to the PPD's MR that has been performed using the DPOs. Note that, while the DPOs were performed, the MR of the SD may have been changed as a result of other directory move requests, although in general the probability of such changes may be low in various embodiments.

To retry the move, the moving thread may begin an atomic operation (element 710) similar to the atomic operation begun in element 512 of FIG. 5, and examine the current MRs of the SD and the PPD. If the current MR of the SD has changed and is so large that it again exceeds the MR of the PPD (as determined in element, the MOPR would again be violated if the SD were made a child of the PPD. Accordingly, the moving thread may end the atomic operation (element 716), releasing any locks that may have been obtained for the atomic operation. At this point, in the depicted embodiment, the moving thread may compute or determine a retry delay interval (e.g., using a random number generator and/or an exponential back-off parameter) (element 719). The use of random delay intervals may help avoid scenarios in which several different moving threads attempt move operations in lock step, potentially leading to repeated retry scenarios, for example. Exponential back-off may also help to better distribute conflicting move requests over time—e.g., so that the probability of any given request having to be retried repeatedly is reduced. The move request may be re-tried after the delay interval (element 722).

If, in the actions corresponding to element 713, the moving thread determines that the new value of the PPD's MR, relative to the SD's MR, permits the addition of the SD as a child of the PPD, the metadata changes needed to designate the SD as the child may be performed (element 725). The atomic operation begun in element 710 may be ended (element 728), and the requested move may be deemed to have completed successfully (element 731).

It is noted that in various embodiments, under most normal operating conditions, retries of the kind illustrated in FIG. 7 may be required only rarely. If reasonable initial MR values and MRDelta values are chosen, the differences between the MR values of different directories of a file system may soon reach levels that typically permit directory moves with no more than one MR change. As indicated earlier, in some embodiments the metadata manager may collect statistics about directory move operations, such as the number of DPOs required for directory moves as a function of the tree depths of SDs and PPDs. Such statistics may be used to select initial MR values, MRDelta values, appropriate MOPRs and tree traversal directions, retry delay intervals, and so on in some embodiments. Machine learning techniques may be used to improve the selection of the directory move related parameters in some embodiments.

It is noted that in various embodiments, operations other than those illustrated in the flow diagrams of FIG. 5, FIG. 6a, FIG. 6b and FIG. 7 may be used to implement at least some of the techniques for supporting concurrent directory moves discussed herein. Some of the operations shown may not be implemented in some embodiments, may be implemented in a different order than illustrated in FIG. 5-7, or in parallel rather than sequentially. In one embodiment, for example, instead of examining only two directories' MRs at a time in a given atomic operation, MRs of three or more directories may be examined in each atomic operation. Increasing the scope of the atomic operations in such a manner may reduce the permitted concurrency slightly, but may require fewer atomic operations overall. In another embodiment, more than one MRDelta value may be determined for a given DPO, and the different MRDelta values may be checked for compliance with the MOPR within the DPO. In various embodiments, instead of the "parent-higher" MOPR and the "towards-root" traversal approach illustrated in FIG. 5-FIG. 7, a different combination of MOPR and traversal direction may be used, such as "parent-higher, towards-leafs", "child-higher, towards-leafs", or "child-higher, towards-root". Depending on the combination selected, the appropriate variations of the operations illustrated in FIG. 5-FIG. 7 may be used in such embodiments.

Use Cases

The techniques described above, of utilizing ranking rules for enabling concurrent directory move operations in file systems may be useful in a variety of scenarios. In some large enterprise networks, especially in provider network environments, large numbers of users may be granted access to a given instance of a file system, which may be implemented using numerous storage and computing devices spread over many different data centers. The assignment of move ranks to directories in accordance with order-reserving rules of the kind discussed above may involve very little overhead (e.g., a small amount of space to store the ranks in metadata structures for the directories). The amount of computation required to check whether a given move operation is permitted given the current move ranks of the source and proposed parent may also be trivial. After a given file system has been in existence for some time, as long as appropriate move ranks (e.g., with reasonable initial deltas between the move ranks of different levels of the directory tree, and reasonable values chosen when changes are required) are used, most requested move operations may require no rank adjustments, and even the ones that do may usually require no more than a few directory-pair operations. The rare occasions when a proposed move corresponds to a file system loop may also be identified with very little overhead. As a result, many more users may typically be able to perform legal directory moves concurrently.

Illustrative Computer System

Figure 8:
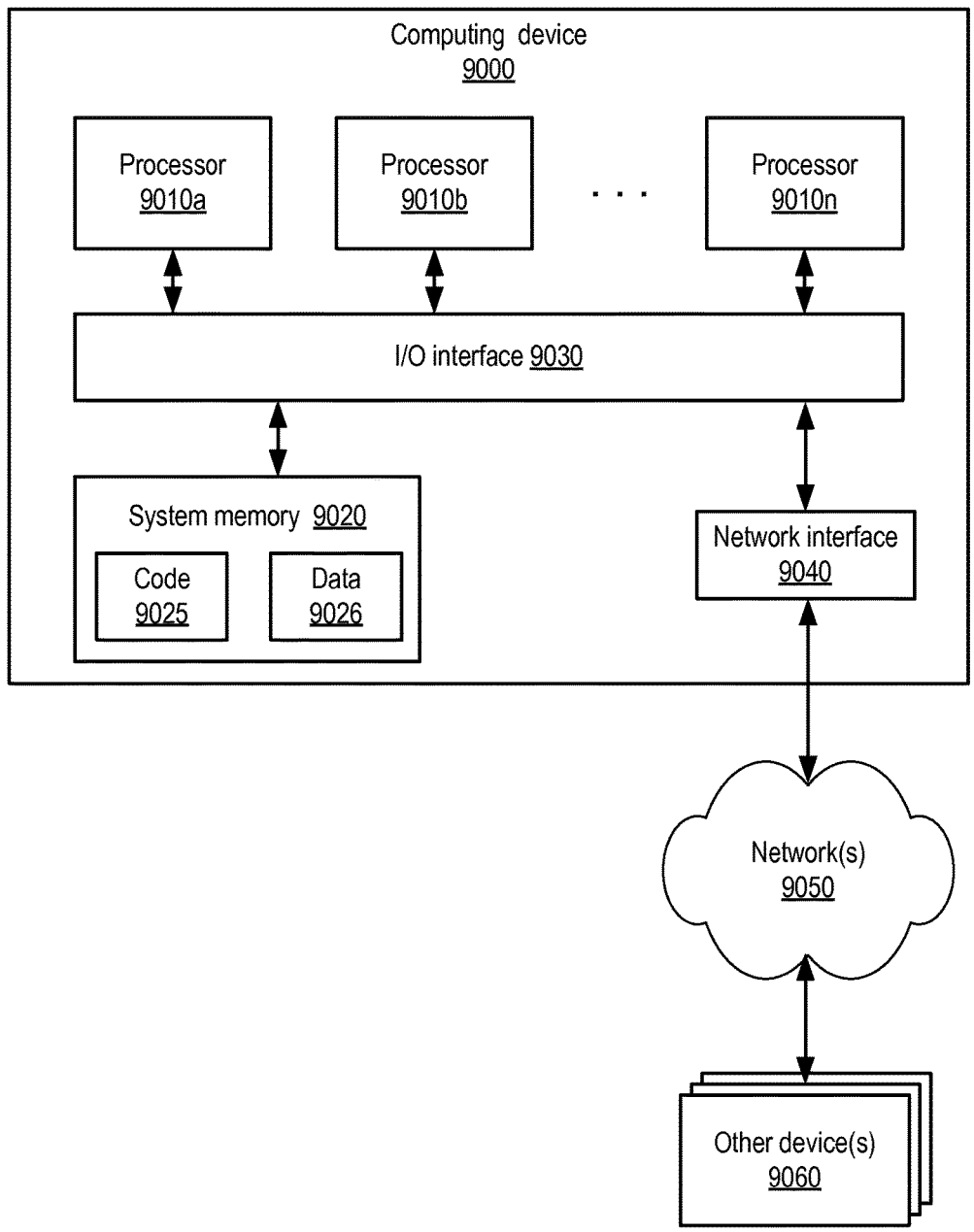
FIG. 8 is a block diagram illustrating an example computing device that may be used in at least some embodiments.

In at least some embodiments, a server that implements one or more of the techniques described above for supporting concurrent directory moves using move ranks (e.g., a server used for at least a portion of a file system metadata manager) may include a general-purpose computer system that includes or is configured to access one or more computer-accessible media. FIG. 8 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 7, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 7 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a metadata manager of a file system, wherein the file system comprises a tree of directories;
   wherein the metadata manager is configured to:
   assign, to each directory in the tree of directories, a respective move rank (MR) according to a particular rank-order-preserving rule designated for the file system, wherein the rank-order-preserving rule specifies that MR pairs of all parent-child directory pairs in the tree satisfy an inequality condition;
   receive a request for a directory move operation, wherein the request indicates (a) a source directory (SD) to be moved and (b) a proposed parent directory (PPD) to which the source directory is to be added as a child;
   determine, in accordance with the particular rank-order-preserving rule, and based at least in part on an examination of a first MR pair comprising respective MRs assigned to the SD and the PPD, whether the directory move operation can be completed without modifying either MR of the first MR pair; and
   in response to a determination that the directory move operation cannot be completed without modifying a particular MR of the first MR pair,
   implement one or more directory-pair operations (DPOs) until a termination status of the directory move operation is determined, wherein the termination status comprises one of: (a) tentative-success or (b) failure due to a detection of a file system loop, wherein the DPOs comprise an operation to modify an MR of a targeted directory of a parent-child pair of directories in accordance with the particular rank-order-preserving rule; and
   in response to a determination that (a) the termination status is tentative-success and (b) the SD can be added as a child of the PPD without violating the particular rank-order-preserving rule, add the SD as a child of the PPD to complete the directory move operation.

2. The system as recited in claim 1, wherein the examination of the first MR pair comprising respective MRs assigned to the SD and the PPD is part of an atomic operation.

3. The system as recited in claim 1, wherein individual ones of the one or more DPOs are implemented as respective atomic operations.

4. The system as recited in claim 1, wherein to perform a first DPO of the one or more DPOs, the metadata manager is configured to:
   determine, based at least in part on the MR assigned to the SD, a new MR value to be assigned to the PPD.

5. The system as recited in claim 4, wherein to perform the first DPO, the metadata manager is configured to:
   determine, based on an examination of the MR assigned to a parent directory of the PPD, that increasing the MR of the PPD by the rank-delta value without increasing the MR assigned to the parent directory of the PPD violates the particular rank-order-preserving rule; and
   defer a modification of the MR of the PPD until the MR of the parent directory of the PPD is modified in a different DPO.

6. A method, comprising:
   performing, by a metadata manager of a file system comprising a tree of directories:
   receiving a request for a directory move operation, wherein the request indicates (a) a source directory (SD) and (b) a proposed parent directory (PPD) to which the source directory is to be added as a child, wherein each directory of the tree is assigned a respective move rank (MR) in accordance with a particular rank-order-preserving rule designated for the file system, wherein the rank-order-preserving rule specifies that MR pairs of all parent-child directory pairs in the tree satisfy an inequality condition;
   in response to determining, in accordance with the particular rank-order-preserving rule, that the directory move operation requires a modification of a particular MR of a first MR pair comprising respective MRs assigned to the SD and the PPD,
   implementing, one or more directory-pair operations (DPOs) until a termination status of the directory move operation is determined, wherein the termination status comprises one of: (a) tentative-success or (b) failure due to a detection of a file system loop, wherein each DPO of the one or more DPOs comprises an attempt to modify an MR of a targeted directory of a parent-child pair of directories in accordance with the particular rankorder-preserving rule, and wherein a first DPO of the one or more DPOs comprises an attempt to modify the particular MR; and in response to determining that (a) the termination status comprises tentative-success and (b) the SD can be added as a child of the PPD without violating the particular rank-order-preserving rule, adding the SD as a child of the PPD to complete the directory move operation.

7. The method as recited in claim 6, wherein the metadata manager comprises a plurality of threads of execution including a first thread and a second thread, wherein said implementing the one or more directory pair operations is performed by the first thread, further comprising:

implementing, by the second thread, subsequent to an initiation by the first thread of a first directory pair operation of the one or more directory move operations, and prior to the determination by the first thread of the termination status of the directory move operation, at least one directory pair operation of a group of directory pair operations corresponding to a different directory move operation.

8. The method as recited in claim 6, further comprising performing, by the metadata manager:

examining, as part of an atomic operation, (a) the MR assigned to the SD and (b) the MR assigned to the PPD, to determine that the directory move operation requires a modification of a particular MR of a first MR pair.

9. The method as recited in claim 6, wherein individual ones of the one or more DPOs are implemented as respective atomic operations.

10. The method as recited in claim 6, wherein the first DPO comprises:

acquiring a first lock on the MR of the SD and a second lock on the MR of the PPD.

11. The method as recited in claim 6, wherein the file system comprises a plurality of metadata nodes including a first node instantiated at a first computing device and a second node instantiated at a second computing device, wherein the MR of the SD is managed by one node of the first and second nodes, wherein the MR of the PPD is managed by the other node of the first and second nodes, wherein the first DPO comprises:

implementing, by the first and second nodes, a distributed commit protocol to modify a particular MR of the first pair of MRs.

12. The method as recited in claim 6, wherein in accordance with the particular rank-order-preserving rule, the MR assigned to a particular directory is required to be lower than the MR assigned to a parent directory of the particular directory.

13. The method as recited in claim 12, wherein the first DPO comprises performing, by the metadata manager:

determining, based at least in part the MR assigned to the SD, a new MR value to be assigned to the PPD.

14. The method as recited in claim 13, wherein the first DPO comprises performing, by the metadata manager:

determining, based on an examination of the MR assigned to a parent directory of the PPD, that increasing the MR of the PPD by the rank-delta value without increasing the MR assigned to the parent directory of the PPD violates the particular rank-order-preserving rule;

deferring a modification of the MR of the PPD until the MR of the parent directory of the PPD is modified.

15. The method as recited in claim 13, wherein the first DPO comprises performing, by the metadata manager:

initiating a second DPO to increase the MR of the parent directory of the PPD, wherein the second DPO comprises an examination of the MR of the grandparent directory of the PPD.

16. The method as recited in claim 6, further comprising performing, by the metadata manager:

in response to determining, with respect to a different directory move request which indicates a second SD and a second PPD, that (a) a termination status of the different directory move request comprises tentative-success and (b) the second SD cannot be added as a child of the second PPD without violating the particular rank-order-preserving rule, determining, using at least one of: (a) a random number generator or (b) an exponential back-off parameter, a retry delay interval for the different directory move request; and re-trying the different directory move request after the retry delay interval.

17. A non-transitory computer-accessible storage medium storing program instructions that when executed on one or more processors implements a metadata manager of a file system comprising a tree of directories, wherein the metadata manager is configured to:

receive a request for a directory move operation, wherein the request indicates (a) a source directory (SD) and (b) a proposed parent directory (PPD) to which the source directory is to be added as a child, wherein each directory of the tree is assigned a respective move rank (MR) in accordance with a particular rank-order-preserving rule designated for the file system, wherein the rank-order-preserving rule specifies that MR pairs of all parent-child directory pairs in the tree satisfy an inequality condition;

in response to determining, in accordance with the particular rank-order-preserving rule, that the directory move operation requires a modification of a particular MR of a first MR pair comprising respective MRs assigned to the SD and the PPD, implement one or more directory-pair operations (DPOs) until a termination status of the directory move operation is determined, wherein the termination status comprises one of: (a) tentative-success or (b) failure due to a detection of a file system loop, wherein each DPO of the one or more DPOs comprises an attempt to modify an MR of a targeted directory of a parent-child pair of directories in accordance with the particular rank-order-preserving rule, and wherein a first DPO of the one or more DPOs comprises an attempt to modify the particular MR; and in response to determining that (a) the termination status comprises tentative-success and (b) the SD can be added as a child of the PPD without violating the particular rank-order-preserving rule, add the SD as a child of the PPD to complete the directory move operation.

18. The non-transitory computer-accessible storage medium as recited in claim 17, wherein the metadata manager is configured to:

examine, as part of an atomic operation, (a) the MR assigned to the SD and (b) the MR assigned to the PPD, to determine that the directory move operation requires a modification of a particular MR of a first MR pair.

19. The non-transitory computer-accessible storage medium as recited in claim 17, wherein individual ones of the one or more DPOs are implemented as respective atomic operations.

20. The non-transitory computer-accessible storage medium as recited in claim 17, wherein in accordance with the particular rank-order-preserving rule, the MR assigned to a particular directory is required to be higher than the MR assigned to a parent directory of the particular directory.

21. The non-transitory computer-accessible storage medium as recited in claim 17, wherein the MR assigned to the SD is stored in an inode structure allocated for the SD.

\* \* \* \* \*